(12) United States Patent
Bouchier et al.

(10) Patent No.: US 8,601,463 B2
(45) Date of Patent: Dec. 3, 2013

(54) FIRMWARE MANAGEMENT

(75) Inventors: Paul Bouchier, Little Elm, TX (US);
Timothy A. Frye, Fort Collins, CO (US); Peter M. Piotrowski, Fort Collins, CO (US); Rick A. Kato, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/258,380

(22) PCT Filed: Dec. 1, 2009

(86) PCT No.: PCT/US2009/066269
§ 371 (c)(1),
(2), (4) Date: Sep. 21, 2011

(87) PCT Pub. No.: WO2011/068502
PCT Pub. Date: Jun. 9, 2011

(65) Prior Publication Data
US 2012/0278795 A1    Nov. 1, 2012

(51) Int. Cl.
*G06F 9/44* (2006.01)
(52) U.S. Cl.
USPC .......................................................... 717/170
(58) Field of Classification Search
USPC .......................................................... 717/170
See application file for complete search history.

(56) References Cited

U.S. PATENT DOCUMENTS

| | | | |
|---|---|---|---|
| 2003/0233493 A1* | 12/2003 | Boldon et al. | 710/1 |
| 2004/0078634 A1* | 4/2004 | Gilstrap et al. | 714/5 |
| 2005/0005269 A1* | 1/2005 | Zilavy | 717/170 |
| 2005/0018212 A1* | 1/2005 | Christensen | 358/1.1 |
| 2008/0005733 A1* | 1/2008 | Ramachandran et al. | 717/168 |
| 2009/0037904 A1* | 2/2009 | Cohen et al. | 717/175 |

OTHER PUBLICATIONS

T. Brey et al.; "BladeCenter chassis management"; IBM Journal of Research and Development; Nov. 2005; pp. 941-961.*
"HP OpenVMS Version 8.2-1 for Integrity Servers: NewFeatures and Release Notes"; Hewlett-Packard website; published Sep. 2005; pp. 1, 2-14.*

* cited by examiner

*Primary Examiner* — Anil Khatri
*Assistant Examiner* — Clint Thatcher

(57) ABSTRACT

Computer-readable storage media, methods and systems are provided for managing firmware on a plurality of field-replaceable units ("FRU") (12). An aspect of installed firmware of the FRU (12) may be compared to an aspect of a firmware bundle. The firmware bundle may contain one or more images that are expected to be installed on the plurality of FRUs (10, 20) already or that are intended to be installed. A mismatch indication may be produced where the aspect of the installed firmware does not match the aspect of the firmware bundle.

14 Claims, 16 Drawing Sheets

Fig. 6

```
oa_host_name> update show system

System firmware version
================================
System bundle: 2.4

The FRUs below contain FW versions which do not match the
installed bundle(s). Please update the system bundles.

Bundle        | Device | Enc | Location | Version
System bundle | XBAR   | 1   | 1        | 2.2
System bundle | BLADE  | 2   | 3        | Invalid
System bundle | OA     | 2   | 2        | 2.3
```

Fig. 7

```
oa_host_name> update show partition 2

Partition firmware version
==========================
Partition bundle: 1.1

The FRUs below contain FW versions which do not match the
installed bundle(s). Please update the partition bundle.

Bundle              Device  Enc  Location  Version
Partition 2 bundle  BLADE   2    3         1.0
Partition 2 bundle  BIOX    5    1         1.0
```

Fig. 8

| SYSTEM FIRMWARE | |  |  |
|---|---|---|---|
| CONFIGURED SYSTEM FIRMWARE VERSION: 1.0.0 | | | |
| "THE FOLLOWING COMPONENTS HAVE MISMATCHED SYSTEM FIRMWARE! | | | |
| ENCLOSURE/BAY | MODEL | | INSTALLED VERSION |
| 1/1 | OA | | 0.9.0 |
| 2/1 | DOME | | 0.9.8 |

Fig. 9

PARTITION 2 FIRMWARE

CONFIGURED PARTITION FIRMWARE VERSION: 1.0.0

ACTIVE PARTITION FIRMWARE VERSION: 1.0.0

"THE FOLLOWING COMPONENTS HAVE MISMATCHED PARTITION FIRMWARE!

| ENCLOSURE/BAY | MODEL | INSTALLED VERSION |
|---|---|---|
| 1/1 | OA | 0.9.0 |

Fig. 10A

```
oa_host_name> update firmware
ftp://server/system_bundle2.3

The URI you provided points to firmware bundle version
2.3.
The following components will be updated:

Device  Enc  Location  Installed Version
------  ---  --------  -----------------
BLADE    2      3       2.2
BLADE    2      4       2.2
XFM      2      2       INVALID
GPSM     2      2       2.1
SIOX     5      -       INVALID Results of the upgrade will be available in the system
log.
...
```

Fig. 10B

```
...
Warning: device(s) contain components which cannot be updated
until partitions using them are shut down. The update operation
will proceed but certain components on these devices will not be
updated, and the system will have mismatched firmware after the
operation completes.

Warning: The XFMs listed below contain components which will not
be updated until you shut down all partitions and run the
"POWEROFF XFM ALL" command from the command-line interface and
reapply this update.

Device      Enc         Location        Installed Version
-------------------------------------------------------------
XFM         1 1         1 1                    1.1
...
```

Fig. 10C

```
...
The devices listed below contain components which will not be
updated until you shut down the partition(s) using them and
reapply this firmware bundle. You can schedule partition
downtime and update partitions over a period of days as
needed to achieve a "rolling upgrade", but the system will
not be supportable until all firmware mismatches have been
resolved.

Device   Enc   Loc.   Installed   nPartition(s)
----------------------------------------------
BLADE    | 2   | 3    | 2.2       | 2
SIOX     | 5   | -    | INVALID   | 1 AND 2

You can abort this update by pressing ^C within 10 seconds.
...
```

Fig. 10D

```
...
Updating devices... DO NOT remove or power cycle device(s)!
This process may take several minutes.
Updated blade 2/3: Success, complete
Updated blade 2/4: Failure, <detailed error message>
Updated SIOX 5: Success, INCOMPLETE - component(s) on this
device cannot be updated while the partition this device is
assigned to is active Firmware update FAILED, firmware may be modified
```

Fig. 11A

```
oa_host_name> update npartition 2
ftp://server/system_bundle2.3
The URI you provided points to firmware bundle version 2.3.
The following blades will be updated in partition 2
"par2_name";
Enc   Location   Installed Version
--------------------------------
2      3         2.2
2      4         2.1
2      5         2.2

Results of the upgrade will be available in the system log.

You can abort this update by pressing ^C within 10 seconds.
:
```

Fig. 11B

```
...
Updating devices... DO NOT remove or power cycle device(s)!
This process may take several minutes.
Updated blade 2/3: Success, complete
Updated blade 2/4: Failure, <detailed error message>
Updated blade 2/5: Success, INCOMPLETE - the nPartition is
active. Restart the nPartition to activate the newly
installed partition firmware.

Firmware update FAILED, firmware may be modified
```

Fig. 12

```
oa_host_name> show blade info 1
Server Blade #1 Information:
  Type: Server Blade Firmware Bundle Revision: 2.5
      *MISMATCH AGAINST CONFIGURED REVISION*
  nPartition Revision: 1.0
      *MISMATCH AGAINST PARTITION 1*
```

FIRMWARE MANAGEMENT

BACKGROUND

A field-replaceable unit, or "FRU," is a modular device that may be removed from a computer, computer system or other electronic equipment, and replaced. Many FRUs include memory (e.g., EEPROM) where fixed computer programs for internal control of the FRU, often referred to as "firmware," are stored.

As computing systems increase in complexity, they typically include more and more FRUs. For example, commercial servers such as blade systems may have dozens, if not hundreds, of different FRUs, each having firmware that needs to be compared with a reference list and updated if necessary. Accordingly, management of firmware of a large number of FRUs on an individual basis is time consuming, subject to human error and, in the case of very large systems, impractical.

Some FRU themselves include FRUs or other components controlled by firmware. For example, a blade system includes a plurality of blades, each being a FRU that can readily be replaced with a similar or identical blade. Each blade itself may include numerous FRUs and other components that are controlled by firmware, such as input/output interfaces, memory, and the like.

System administrators may manage firmware in various ways. Some administrators may upgrade firmware for each FRU and component residing on every blade to the latest revision of firmware. Other administrators may wish to standardize the firmware controlling FRUs or other components that are common among multiple blades, regardless of what the latest version of firmware might be for each individual FRU or component.

FRUs can be replaced at any time, potentially causing unexpected version mismatches among firmware of FRUs. There is a need for the ability to detect these types of mismatches and correct them. There is also a need for the ability to change the version of firmware (e.g., upgrade) on multiple FRUs or mismatching FRUs in a single operation.

Businesses and organizations may expend large amounts of resources to manage firmware as described above, particularly in complex systems. For example, a business may pay a manufacturer of a complex system (e.g., a blade system) to send a specialized system administrator out periodically to update each firmware image of each FRU of the complex system.

BRIEF DESCRIPTION OF THE DRAWINGS

FIG. 6 depicts a user interface being used to compare an aspect, of firmware installed, on a plurality of FRUs to an aspect of a firmware bundle containing images that are expected to have been installed on the plurality of FRUs, according to an embodiment of the invention.

FIG. 7 depicts a user interface being used to compare an aspect of firmware installed on a plurality of FRUs of a partition to an aspect of a firmware bundle containing images that are expected to have been installed on the plurality of FRUs of the partition, according to an embodiment of the invention.

FIG. 8 depicts a graphical user interface ("GUI") being used to compare an aspect of firmware installed on a plurality of FRUs to an aspect of a firmware bundle containing images expected to have been installed on the plurality of FRUs, according to an embodiment of the invention.

FIG. 9 depicts a GUI being used to compare an aspect of firmware installed on a plurality of FRUs of a partition to an aspect of a firmware bundle containing images expected to have been installed on the plurality of FRUs of the partition, according to an embodiment of the invention.

FIGS. 10A-D depicts a user interface being used to update firmware of a plurality of FRUs, according to an embodiment of the invention.

FIGS. 11A-B depicts a user interface being used to update firmware of a plurality of FRUs in a partition, according to an embodiment of the invention.

FIG. 12 depicts a user interface being used to compare firmware of a particular FRU to firmware expected to have been installed on a plurality of FRUs of which the FRU is a member, according to an embodiment of the invention.

DETAILED DESCRIPTION

Figure 1:
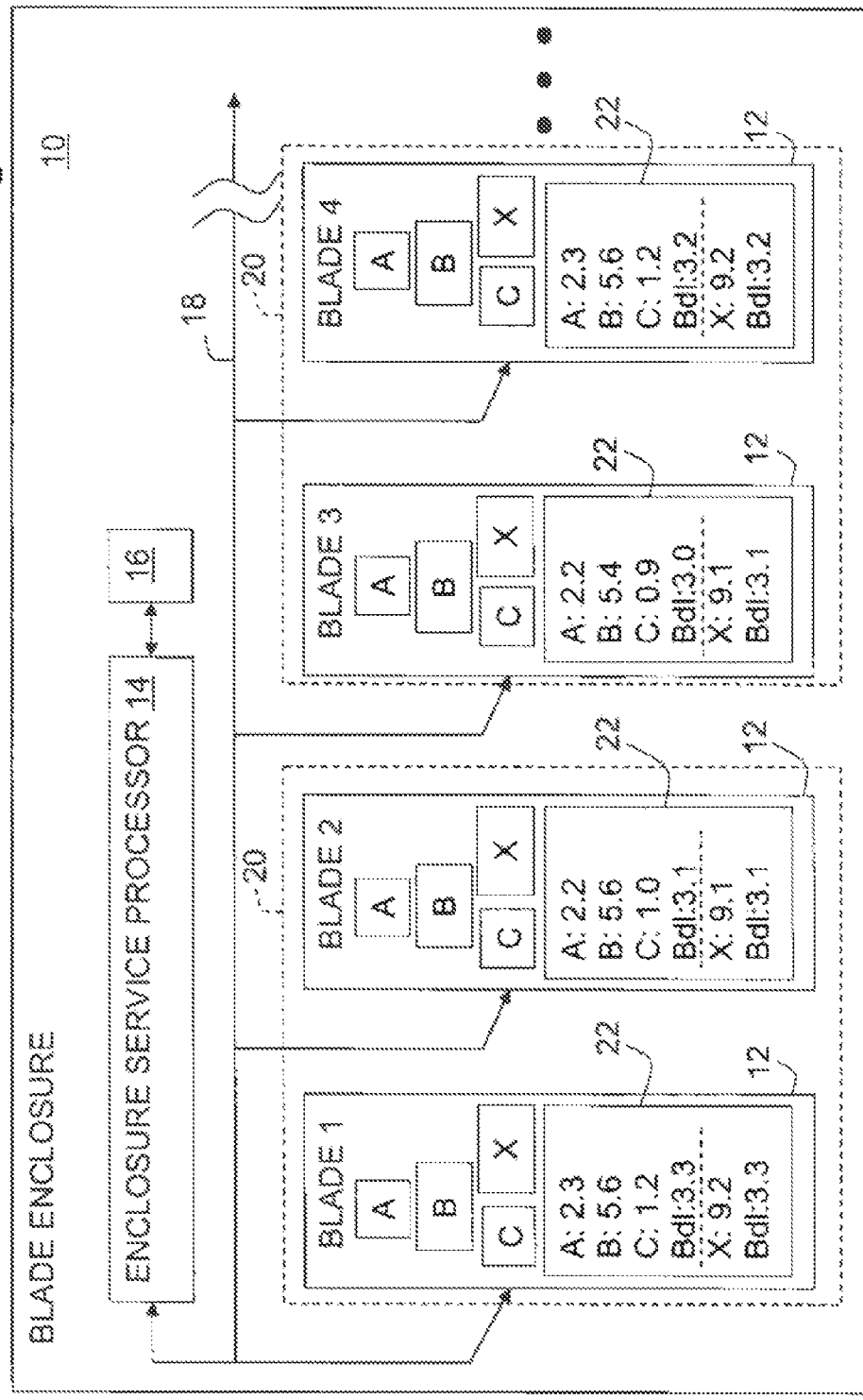
FIG. 1 depicts, schematically, an example enclosure for housing a plurality of FRUs, in this case blades, according to an embodiment of the invention.

A FRU such as a blade may include components that are controlled by executable instructions, or "firmware." Some of these components, such as a peripheral plugged into a PCI slot, also may be FRUs. However, for purposes of this disclosure, the term "FRU" refers to a FRU such as a blade that includes one or more components controlled by firmware. The components of the FRUs that are controlled by firmware, regardless of whether they are field-replaceable units themselves, will be referred to as "components."

As used herein, "image" means firmware that is used to control a particular component of a FRU. For example, a processor that is installed on a blade may have memory on the blade that includes firmware that controls operation of the processor and parts of the blade. As used herein, the term "installed firmware" means one or more images contained in memory of a FRU to control operation of various components of the FRU.

Each image may have a version, which may be identified in a sequence of computer-readable and/or human-readable symbols referred to herein as an "image version identifier." An image having a particular image version identifier X may be referred to herein as "image version X."

As used herein, a "firmware bundle" means a collection of images configured to be installed on a collection of components controlled by firmware. Images of a firmware bundle may be chosen specifically to correspond with firmware-controlled components of a FRU such as a blade. For example, an administrator may update all out-of-date components of a blade at once using images contained in a single firmware bundle, rather than upgrading images for each component of the blade separately. Also, an administrator may, in a single action, upgrade multiple FRUs, each having multiple components, rather than upgrading each component of each FRU individually. Additionally, an administrator may independently upgrade all FRUs of a logical division, or partition, of a system.

As was the case with each image, a firmware bundle itself may have a version that may be represented in a sequence of computer-readable and/or human-readable symbols referred to herein as a "firmware bundle version identifier." A firmware bundle having a particular firmware bundle version identifier Y may be referred to herein as "firmware bundle version Y."

Installed firmware of a FRU may be compared to other firmware for various purposes. On one hand, an administrator may wish to verify that installed firmware of a replacement FRU is up-to-date and/or compliant with firmware expected to be installed on FRUs of a partition or an enclosure. On the other hand, an administrator may wish to update installed firmware of one or more FRUs, but before updating, the system may compare the installed firmware of the one or more FRUs to the incoming firmware to confirm that an update is actually necessary, and if so, which components of which FRUs should be updated.

Firmware may be organized into firmware bundles in order to simplify comparison with installed firmware. One type of firmware bundle to which installed firmware of a FRU may be compared is a firmware bundle containing images that are expected or supposed to be installed already on a plurality of FRUs of which the FRU is a member. Another type of firmware bundle to which installed firmware may be compared is a firmware bundle that contains updates for one or more images of the installed firmware.

Rather than comparing installed firmware files of FRUs directly to firmware bundle files (e.g., comparing installed binary files of a FRU to binary image files contained in a firmware bundle), both installed firmware of a FRU and other firmware bundles may have "aspects" that are compared instead. Aspects of installed firmware and/or firmware bundles may be described in metadata. Metadata may be data about image files or the firmware bundle file that contains the image files. Metadata may be stored in various locations, such as system memory 16.

An aspect of installed firmware of a FRU, which may be described in metadata, may include various characteristics or features of the installed firmware, such as image version identifiers of each image that is installed on a FRU, and a firmware bundle version identifier of a firmware bundle containing images that were last installed on a FRU. Aspects of installed firmware may be contained in metadata that is stored by itself, without the associated image files or firmware bundle files, in various memory locations.

Similarly, an aspect of a firmware bundle may include various characteristics or features of the firmware bundle, such as image version identifiers of each image that is contained in the firmware bundle, and a firmware bundle version identifier of the firmware bundle itself. Aspects of firmware bundles may be contained in metadata that is stored by itself, without the associated image files or firmware bundle files, in various memory locations.

FIG. 1 depicts a system 10 that includes infrastructure for interconnecting a plurality of FRUs 12. In this example, system 10 is a blade enclosure and each FRU 12 is a blade. System 10 includes a service processor 14 that functions to control interaction between the plurality of FRUs 12 and memory 16 that is available to service processor 14. In exemplary embodiments, memory 16 is persistent relative to each FRU 12. For example, information in memory 16 may be unaffected by replacement of one or more FRUs. In some instances, memory 16 includes EEPROM. Each FRU 12 may be in communication with the other FRUs 12 and the service processor 14 via a shared backplane 18. Although four FRUs 12 are depicted in FIG. 1, it should be understood that more or fewer FRUs may be included in a system.

FRUs of a system may be allocated among any number of logical partitions. In some instances, some of the FRUs of a partition may operate together as a symmetric multiprocessor ("SMP") computing system. In disk array applications, FRUs of a partition, or even a subset of FRUs of a partition, may operate together as a logical storage volume. In FIG. 1, the four visible FRUs 12 are allocated among two logical partitions 20, each of which functions as a separate independent SMP computer.

Each FRU 12 in FIG. 1 includes three generic components that are controlled by firmware images: Component A; Component B; and Component C. These components may include system processors, management processors, disk drives, field-programmable gate arrays, network interfaces, and so forth. A FRU such as a blade may include any number of computer components; three are shown in FIG. 1 for illustrative purposes only. Certain components may have multiple images For example, a processor running the Red Hat® Linux operating system may have multiple associated Red Hat® Package Manager ("RPM") images.

In FIG. 1, each FRU 12 has stored in its memory 22 a firmware bundle version identifier of a firmware bundle from which images were last installed on the FRU 12. For example, one or more images from firmware bundle version 3.3 were last installed on the FRU 12 labeled BLADE 1. Firmware bundle version 3.3 includes image version 2.3 for component A, image version 5.6 for component B, and image version 1.2 for component C. One or more images from firmware bundle version 3.1 were last installed on the FRU 12 labeled BLADE 2. Firmware bundle version 3.1 includes image version 2.2 for component A, image version 5.6 for component B and image version 1.0 for component C. One or more images from firmware bundle version 3.0 were last installed on the FRU 12 labeled BLADE 3. Firmware bundle version 3.0 includes image version 2.2 for component A, image version 5.4 for component B and image version 0.9 for component C. One or more images from firmware bundle version 3.2 were last installed on the FRU 12 labeled BLADE 4. Firmware bundle version 3.2 includes image version 2.3 for component A, image version 5.6 for component B and image version 1.2 for component C. As seen in FIG. 1, the installed image version identifiers of each FRU 12 also may be stored in memory 22 on the FRU 12 (e.g., in a metadata file).

A version identifier of a firmware bundle containing images that are expected to be installed on a plurality of FRUs already, as well as version identifiers of each image of such a firmware bundle, may be stored in memory that is persistent relative to each FRU, such as in system memory 16 in FIG. 1.

Figure 2:
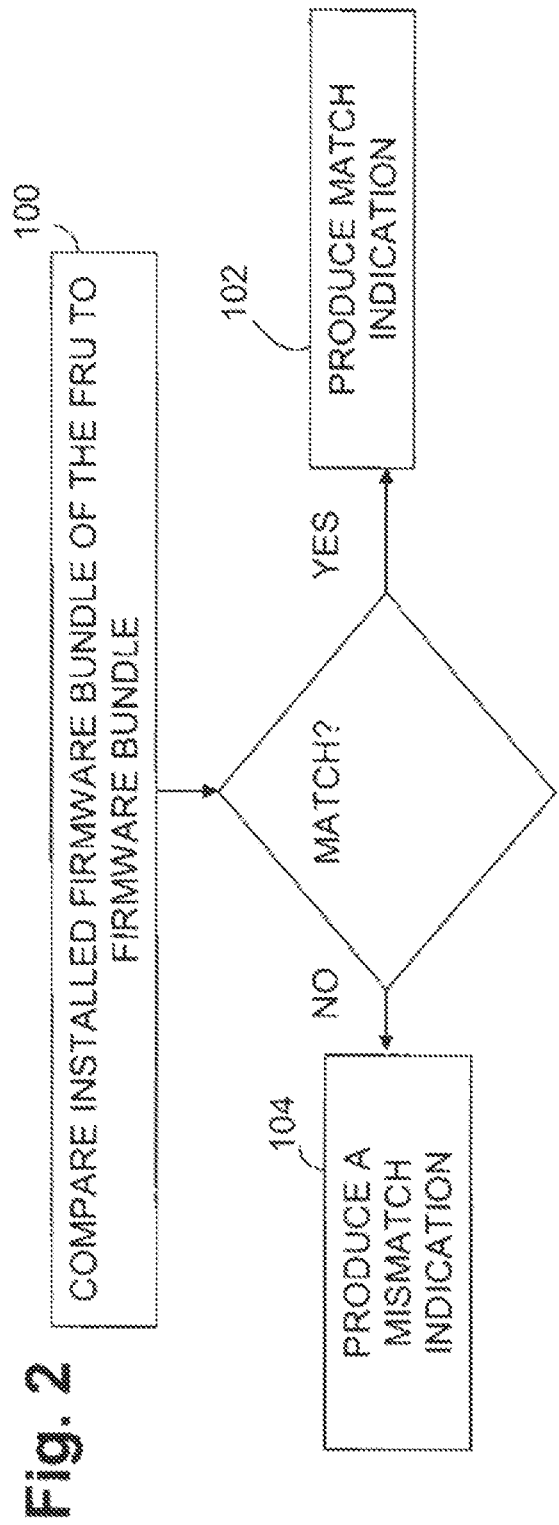
FIG. 2 depicts an example method of determining whether an aspect of firmware installed on a FRU matches an aspect of a firmware bundle containing one or more images expected to be installed on a plurality of FRUs of which the FRU is a member, according to an embodiment of the invention.

Accordingly, an aspect of installed firmware of a FRU may be compared to an aspect of a firmware bundle to determine whether the installed firmware is up-to-date, either with firmware expected to be installed on a plurality of FRUs (e.g., in a system 10 or of a partition 20) of which the FRU is a member, or with images contained in an outside firmware bundle that are intended to be installed. The method depicted in FIG. 2 is one example of such a comparison. For each FRU of a plurality of FRUs, at step 100, an aspect of the installed firmware on the FRU may be compared to an aspect of a firmware bundle containing images.

If the aspects match, then a match indication is produced at step 102. If the aspects do not match, a mismatch indication is produced at step 104. A match indication may include output that the installed firmware matches the firmware bundle. A match indication may also be an internal indicator that is used to determine whether to perform an update. A mismatch indication likewise may include output that a firmware update of FRU is suggested, or in some instances, required. A mismatch indication may also be an internal indicator that an update is to be executed, as will be described below.

As noted above, an aspect of installed firmware and/or a firmware bundle may include versions of individual images or a version of the firmware bundle as a whole. Accordingly, comparing an aspect of installed firmware of a FRU to an aspect of a firmware bundle may be accomplished in a number of ways.

Figure 3:
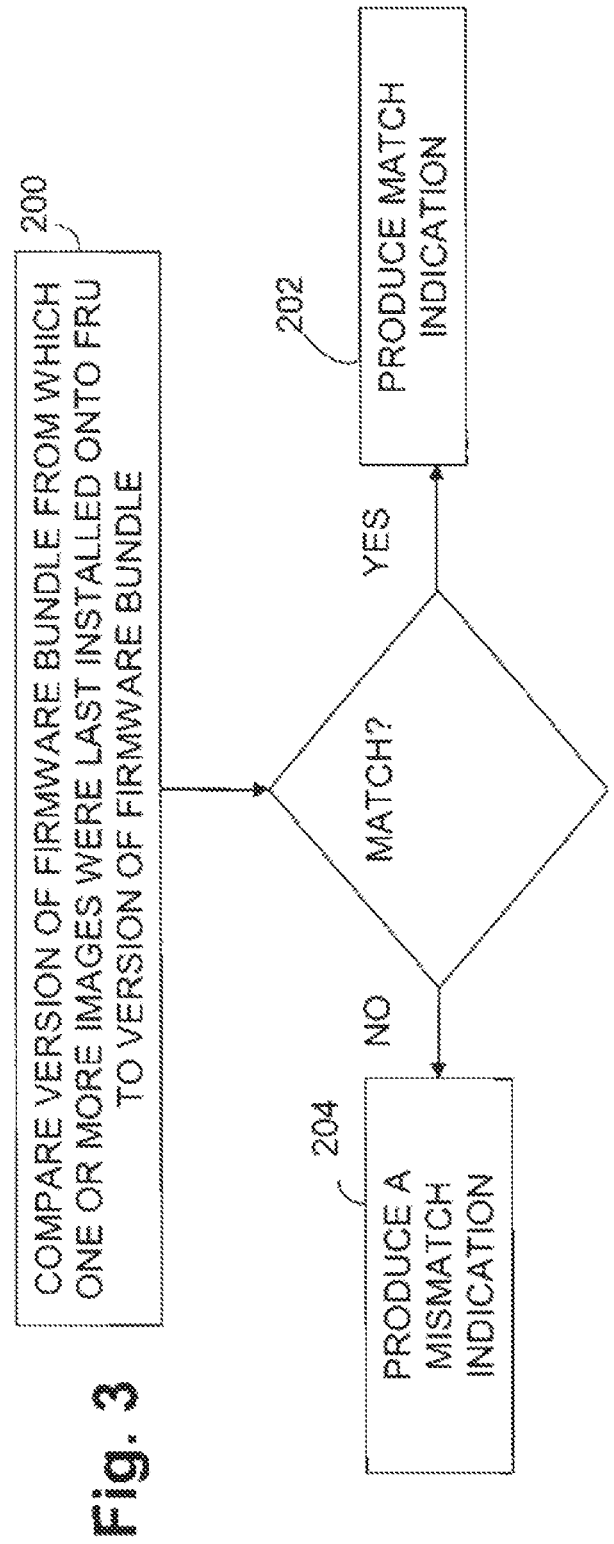
FIG. 3 depicts an example method of determining whether a version of a firmware bundle from which one or more images were last installed onto a FRU matches a version of a firmware bundle containing one or more images expected to be installed on a plurality of FRUs of which the FRU is a member, according to an embodiment of the invention.

For example, FIG. 3 depicts a method similar to that shown in FIG. 2, except that the aspect of the installed firmware includes a firmware bundle version identifier of a firmware bundle from which images were last installed onto a FRU. The aspect of the firmware bundle, to which the aspect of the installed firmware may be compared, also may include a firmware bundle version identifier of the firmware bundle. These two firmware bundle version identifiers may be compared at step 200 to determine whether the installed firmware matches the firmware bundle. If the version identifiers match, then a match indication is produced at step 202. If the version identifiers do not match, a mismatch indication is produced at step 204.

Figure 4:
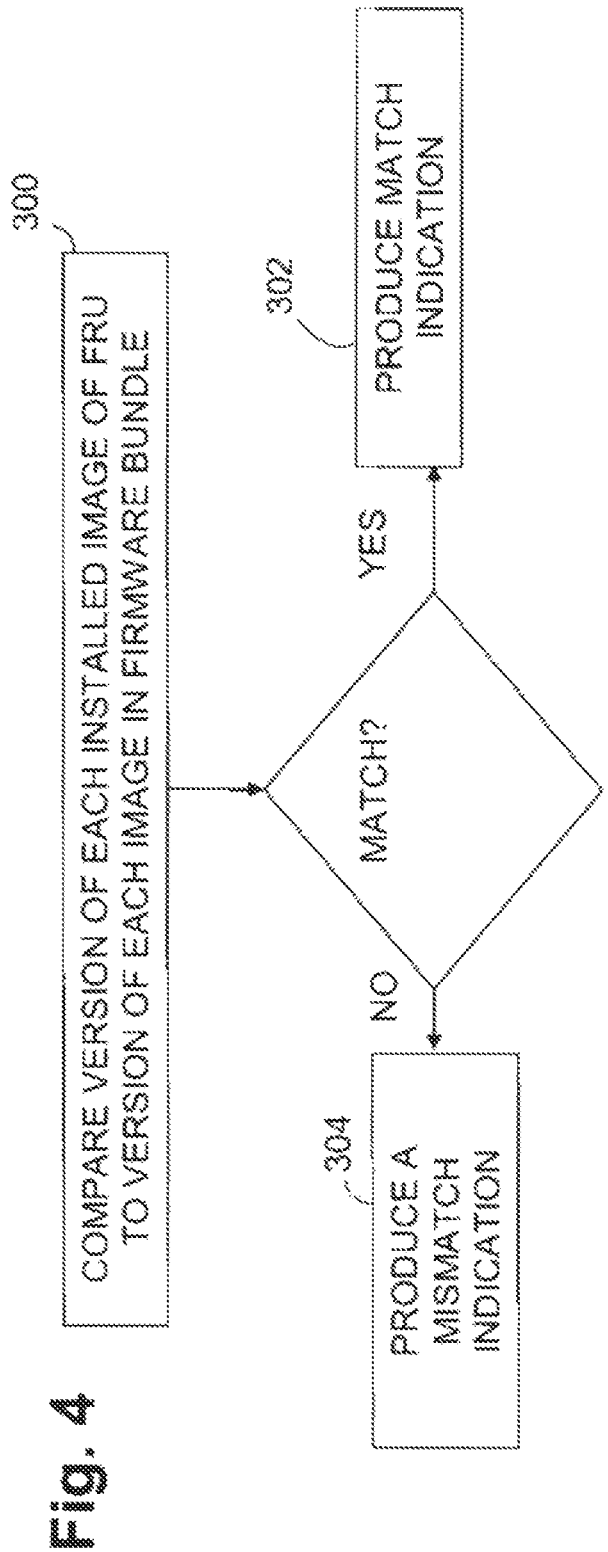
FIG. 4 depicts an example method of determining whether a version of each installed image of a FRU matches a version of each image contained in a firmware bundle containing one or more images expected to be installed on a plurality of FRUs of which the FRU is a member, according to an embodiment of the invention.

Additionally or alternatively, the aspect of the installed firmware may include a version identifier of each installed image of a FRU, and the aspect of a firmware bundle may include a version identifier of each image contained therein that corresponds to each installed image of the FRU. An example of such a method is shown in FIG. 4. The version identifier of each installed image of the FRU 12 may be stored in memory (e.g., 20) of the FRU. The version identifiers of the installed images may be compared to version identifiers of the firmware bundle images expected to be installed at step 300 to determine whether the installed firmware matches the firmware of the bundle. If the image version identifiers match, then a match indication is produced at step 302. If the image version identifiers do not match, a mismatch indication is produced at step 304.

In some embodiments, the aspect of the installed firmware of a FRU may include version identifiers of both a firmware bundle from which images were last installed onto the FRU and each installed image of the FRU. Likewise, an aspect of a firmware bundle may include version identifiers of both the firmware bundle and the images contained therein.

Figure 5:
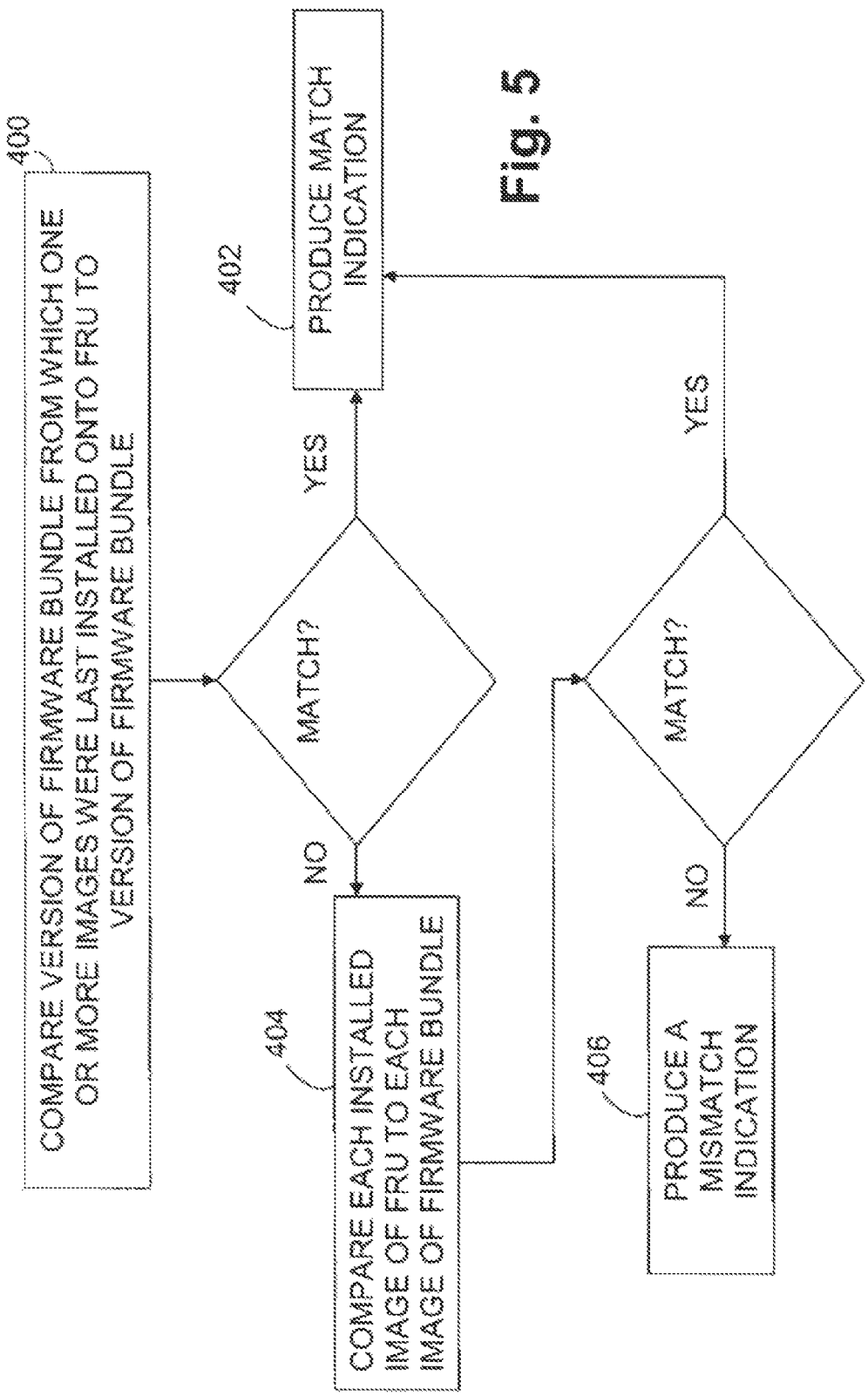
FIG. 5 depicts an example method of determining whether firmware installed on a FRU matches firmware that is expected to be installed on a plurality of FRUs using a combination of the steps of the methods shown in FIGS. 3 and 4, according to an embodiment of the invention.

An example of this is seen in FIG. 5, which is a combination of the methods shown in FIGS. 3 and 4. In step 400, a version identifier of a firmware bundle from which images were last installed on a FRU is compared a version identifier of another firmware bundle. If the version identifiers match, a match indication may be reported, as shown in step 402.

If the version identifiers do not match, this does not necessarily mean the installed firmware of the FRU is out-of-date. In step 404, a version identifier of each installed image of the FRU is compared to a version identifier of each image of the firmware bundle. If all the image version identifiers match, the FRU may operate as expected and there may be no need to update the installed images of the FRU. In such cases, a match indication may be produced, as indicated in step 402. If the FRU stores the version identifier of the firmware bundle from which images were last installed in its own memory (e.g., 22), this version identifier may be updated to match the version identifier of the other firmware bundle. Accordingly, future comparisons of installed firmware to the same firmware bundle will not require comparison of individual images.

If one or more installed image version identifiers do not match one or more image version identifiers of the firmware bundle, then at step 406, a mismatch indication may be produced.

The methods described in FIGS. 2-5 may be better understood upon seeing them applied to FRUs from FIG. 1. Assume that firmware bundle version 3.3 contains images that are expected to have been installed on each FRU 12. Assume also that firmware bundle version 3.3 includes image version 2.3 that is meant to be installed on Component A, image version 5.6 that is meant to be installed on Component B, image version 1.2 that is meant to be installed on Component C, and a fourth image version 6.8 that is meant to be installed on a fourth component D that does not exist on the FRUs 12 in FIG. 1. Both the firmware bundle version identifier, 3.3, as well as the version identifiers of each of the images contained therein, may be stored in memory that is persistent relative to the FRUs 12, such as memory 16 of system 10.

The FRU 12 labeled BLADE 1 has stored in its memory 22 a version identifier of a firmware bundle from which images were last installed on the FRU 12, 3.3. Thus, the method of FIG. 3, which compares firmware bundle version identifiers at step 200, would determine that the version identifier of the firmware bundle containing images expected to have been installed, 3.3, matches the version identifier of the firmware bundle from which images were last installed onto the FRU 12 labeled BLADE 1. Accordingly, the method of FIG. 3 proceeds to step 202 and a match indication is produced.

The FRU 12 labeled BLADE 2 has stored in its memory 22 a version identifier of a firmware bundle from which images were last installed on the FRU 12, 3.1. Thus, the method of FIG. 3, which compares firmware bundle version identifiers at step 200, would determine that the version identifier of the firmware bundle containing images expected to have been installed, 3.3, does not match the version identifier of the firmware bundle from which images were last installed onto the FRU 12 labeled BLADE 2. Accordingly, the method of FIG. 3 proceeds to step 204 and a mismatch indication may be produced.

The method of FIG. 4 would produce a similar result as the method of FIG. 3 regarding the FRU 12 labeled BLADE 2. At step 300, a version identifier of each installed image of the FRU 12 labeled BLADE 2 may be compared to a version identifier of a corresponding image of the firmware bundle containing images expected to have been installed. Right away, the installed version identifier of Component A, 2.2, does not match the version identifier of the image expected to have been installed, 2.3, and so the method of FIG. 4 would proceed to step 304 and produce a mismatch indication.

The FRU 12 labeled BLADE 4 has stored in its memory 22 a version identifier of a firmware bundle from which images were last installed on the FRU 12, 3.2. Thus, the method of FIG. 3, which compares firmware bundle version identifiers at step 200, would determine that the version identifier of the firmware bundle containing images expected to have been installed, 3.3, does not match the version identifier of the firmware bundle from which images were last installed onto the FRU 12 labeled BLADE 4. Accordingly, the method of FIG. 3 proceeds to step 204 and a mismatch indication is produced.

A different result is produced where the method of FIG. 4 is used with the FRU 12 labeled BLADE 4. At step 300, a comparison of the version identifiers of installed images of each component of the FRU 12 labeled BLADE 4 to version identifiers of the images of the firmware bundle containing images expected to have been installed yields a match. Because BLADE 4 does not have a component D, the image version of component D is disregarded.

Even though the version identifier of the firmware bundle from which images were last installed onto the FRU 12 labeled BLADE 4 (3.2) and version identifier of the firmware bundle containing images expected to have been installed (3.3) do not match, from a practical standpoint, this may not matter. The FRU 12 labeled BLADE 4 has the same images installed that are contained in firmware bundle 3.3, and therefore it may operate the same as a FRU that had actually been updated with the images contained in firmware bundle version 3.3 (such as the FRU 12 labeled BLADE 1). Accordingly, the method of FIG. 4 would proceed to step 302, and a match indication may be produced. The memory 22 of the FRU 12 labeled BLADE 4 may also be updated to indicate that the version identifier of the firmware bundle from which images were last installed is version 3.3.

The method of FIG. 5 would yield the same result in regard to the FRU 12 labeled BLADE 4 as the method shown in FIG. 4. At step 400, the version identifier of the firmware bundle from which images were last installed onto the FRU 12 labeled BLADE 4, 3.2, is compared to the version identifier of a firmware bundle containing images expected to have been installed on a plurality of FRUs 12 of which the FRU 12 is a member, version 3.3. These do not match so the method of FIG. 5 proceeds to step 404, where the version identifiers of images of each firmware bundle are compared. All the images match, and so a match indication is produced at step 402.

The methods of FIGS. 2-5 may be performed alone, solely for the purpose of comparing firmware installed on a FRU to a firmware bundle to determine whether the installed firmware is up-to-date. An example user interface for performing such a task is shown in FIG. 6. Here, the interface is a command line interface, and a user has input the command "update show system." This command prompts execution of steps shown in FIGS. 2-5.

The "System firmware version" immediately below the input command represents the firmware bundle containing images that are expected to have been installed on a plurality of FRUs in a system—namely, version 2.4. In this example, some of the FRUs within the system have installed firmware with aspects that do not match an aspect of the firmware bundle containing images expected to have been installed. For instance, the FRU labeled "XBAR" has installed images that were installed from a firmware bundle version 2.2. Likewise, the FRU labeled "OA" ("onboard administrator") has installed images that came from a firmware bundle version 2.3. The FRU labeled "BLADE" has stored in its memory a version identifier of a firmware bundle from which images were last installed of "invalid." A version value of "invalid" may occur for a number of reasons, such as a previous unsuccessful firmware installation, which will be described below.

Some embodiments may be configured to output information only about those FRUs that are mismatching or out-of-date, rather present a large amount of detail about which components of each FRU have mismatching images. For example, interfaces described herein do not describe which image versions are installed or supposed to be installed. Rather, interfaces described herein may output more general information, such as an indication that a firmware bundle does not match a firmware bundle from which images were last installed. Simplifying the output in this manner makes the task of firmware management accessible to a larger set of users.

Rather than containing images for installation on any FRU of a system, some images in firmware bundles may be partition-specific; i.e. they may be meant to be installed on FRUs of a particular partition. FRUs may have a subset of components that receive partition-specific images from firmware bundles. Images of these partition-specific components may be tracked separately from component firmware for the system 10 as a whole. For example, in FIG. 1, the FRUs 12 each have a partition-specific Component, X, that is indicated in memory 22 as being separate from the other components, as shown by the dashed lines.

FIG. 7 depicts an example user interface for comparing firmware installed on FRUs of a particular partition to partition-specific images of a firmware bundle. This interface may operate similarly to the interface shown in FIG. 6 and may cause methods similar to those shown in FIGS. 2-5 to be executed. The primary difference between the methods initiated by the interfaces of FIGS. 6 and 7 is the universe of FRUs to which firmware of each FRU is compared.

In FIG. 6, the interface is used to compare aspects of installed firmware of FRUs to an aspect of a firmware bundle containing images expected to have been installed on a system of FRUs, such as system 10 in FIG. 1. By contrast, the interface of FIG. 7 is used to compare an aspect of partition-specific installed firmware of FRUs of a partition to an aspect of partition-specific images in a firmware bundle containing images expected to have been installed on every FRU of the partition. The methods that may be implemented by the interface of FIG. 7 are better understood when described in the context of the system 10 of FIG. 1.

In partition 20 on the left, the image version of Component X on the FRU 12 labeled BLADE 1 is 9.2, and the image version of Component X on the FRU 12 labeled BLADE 2 is 9.1. In partition 20 on the right, the image version of Component X on the FRU 12 labeled BLADE 3 is 9.1, and the image version of Component X on the FRU 12 labeled BLADE 4 is 9.2.

As mentioned above, a firmware bundle from which a subset of images was last installed on the partition-specific components of a FRU may be separately tracked. For example, a firmware bundle from which a subset of images was last installed on the partition-specific components (i.e., Component X) of FRU 12 labeled BLADE 1 has a version identifier of 3.3. The firmware bundle from which a subset of images was last installed on the partition-specific components of FRU 12 labeled BLADE 2, however, has a version identifier of 3.1. A firmware bundle from which a subset of images was last installed on the partition-specific components of FRU 12 labeled BLADE 3 has a version identifier of 3.1. The firmware bundle from which a subset of images was last installed on the partition-specific components of FRU 12 labeled BLADE 4, however, has a version identifier of 3.2.

When the routine of FIG. 7 is executed, an aspect of installed firmware of each FRU 12 of the partition 20 may be compared to an aspect of a firmware bundle containing partition-specific images tailored specifically for the partition 20. This comparison may be performed to determine whether FRUs 12 of a partition 20 are up-to-date with firmware expected to be installed on FRUs 12 of the partition, or with an outside firmware bundle containing partition-specific images.

For example, and referring to FIG. 1, assume the firmware bundle containing images expected to be installed on partition 20 on the right has a version identifier of 3.3 and includes an image for Component X having an image version identifier of 9.2. As before, these versions identifiers may be part of an aspect of the firmware bundle version 3.3 that is described in metadata that may be stored in various memory locations.

If the "update show partition" command is executed with relation to partition 20 on the right, it would be determined using the method shown in FIG. 3 that FRU 12 labeled BLADE 3 has a firmware bundle version identifier (3.1) that does not match the firmware bundle version identifier of firmware bundle version 3.3, and a mismatch indication would be returned at step 202. The same result would be reached in step 400 of FIG. 5, except that FIG. 5 would proceed to step 404, rather than return a mismatch indication. In step 404, it would be determined that the FRU 12 labeled BLADE 3 has a Component X with an installed image having a version identifier of 9.1, which does not match the image version identifier (9.2) of Component X in the firmware bundle. Accordingly, a mismatch indication would be produced at step 406.

A different result would be reached if the steps of the method of FIG. 5 were performed on the FRU 12 labeled BLADE 4. At step 400, it would be determined that that FRU 12 labeled BLADE 4 has a firmware bundle version identifier (3.2) that does not match the firmware bundle version identifier of firmware bundle version 3.3. However, when the individual image version identifiers are compared in step 404, a match would be produced, which means the partition-specific firmware of FRU 12 labeled BLADE 4 is up-to-date with the firmware expected to be installed on FRUs of its partition 20. In some cases, the partition-specific firmware bundle version identifier that is stored in FRU 12 labeled BLADE 4 may be updated to version 3.3, to avoid subsequent comparisons.

User interfaces for executing methods described herein are not limited to command line interfaces. FIGS. 8 and 9 depict GUIs being using to display information similar to that displayed in FIGS. 6 and 7, respectively. In FIG. 8, the "Configured Complex Firmware Version" of 1.0.0 at the top is the firmware bundle containing images expected to have been installed on each FRU of a complex or system. In this example, the images last installed on a FRU labeled "OA" were from a bundle version 0.9.0. Likewise, the images last installed on a FRU labeled "Dome" were from a bundle version of 0.9.8. Accordingly, both FRUs are considered to have mismatched firmware.

In FIG. 9, the firmware of "Partition 2" of an example system is being analyzed. The "Configured Partition Firmware Version" is the firmware bundle containing images expected to have been installed on each FRU of "Partition 2." In this example, the images last installed on a FRU labeled "OA" were from a bundle version 0.9.0, which does not match the expected firmware bundle version, 1.0.0.

The methods of FIGS. 2-5 also may be performed as part of a firmware update process. For example, after a mismatch indication is produced at step 104 of FIG. 2, a FRU with mismatching firmware may be updated with images from the firmware bundle to which installed firmware of the FRU was compared.

Examples of interfaces being used to perform firmware updates are shown in FIGS. 10-11. In some embodiments, before installing images from the firmware bundle, an indication may be stored in memory (e.g., 22) of the FRU that the version identifier of the firmware bundle from which images were last installed is "invalid." That way, if installation is unsuccessful (e.g., due to a power outage), the version identifier will remain invalid and may be easily discovered. After installation is completed successfully, the version identifier of the firmware bundle from which new images were installed may be stored in the memory of FRU as the version identifier of the firmware bundle from which images were last installed onto the FRU.

FIGS. 10A-D depict an interface being used to update firmware of a plurality of FRUs of a system 10. The following command has been entered:

update firmware ftp://server/system_bundle2.3

The interface first confirms that the user wishes to install images of a firmware bundle version 2.3 that is located on a server. One or more of the routines shown in FIGS. 2-5 may be executed to determine which FRUs should be updated (i.e., those FRUs that produce a mismatch when their firmware is compared to the images of the bundle version 2.3). The interface outputs the resulting. FRUs that are going to be updated prior to installation. This provides an opportunity to cancel the update if the results will be unsatisfactory.

In embodiments where a FRU is part of a partition (e.g., 20 in FIG. 1) that is currently running, updating firmware on the FRU may include installing images of a firmware bundle onto as many components of the FRU as possible. It may not be possible to update some components of some FRUs (e.g., XFM components) until partitions using those components are shut down. An indication may be produced that installation was not completed where at least one image was not installed onto a component of the FRU that should have received the at least one image.

Examples of this are seen in FIGS. 10B and 10C. In 10B, the interface indicates that some FRUs cannot be completely updated until partitions using the FRUs are shut down. In this case, the FRU labeled "XFM" will not be updated until a partition using it is shut down. The interface indicates again later (seen in 10C) that other devices will not be updated until partitions using them are shut down. These include a FRU labeled "BLADE" that is used by partition 2, and a FRU labeled "SIOX" that is used by partitions 1 and 2.

FIGS. 11A-B depict an interface being used to update firmware of one or more FRUs of a partition. The following command has been entered:

update npartition 2 ftp://server/system_bundle2.3

Instead of updating each FRU of a partition with a firmware bundle containing images meant to be installed on each FRU of the partition, here the command updates a subset of components of each FRU of the partition with images from a bundle containing images for every FRU of the entire system (e.g., system 10).

The "update npartition" command of FIGS. 11A-B prompts execution of one or more of the routines shown in FIGS. 2-5 to determine whether an aspect of a subset of firmware installed on each FRU of partition 20 matches an aspect of a firmware bundle, version 2.3, that contains images meant to be installed on each FRU of the entire system. The progress of the partition firmware update may be shown at the bottom.

FIG. 12 depicts an example interface being used to cause the output of information about images installed on a particular FRU. Here, the command "show blade info 1" causes an aspect of firmware installed onto a FRU to be compared to an aspect of a firmware bundle containing images expected to have been installed on both the entire system in which the FRU resides and a particular partition of the system of which the FRU is a member. In this example, the aspect of the installed firmware of the FRU does not match an aspect of either firmware bundle containing images expected to have been installed.

We claim:

1. A non-transitory computer-readable storage medium having computer executable instructions for managing firmware of a field-replaceable unit (12) ("FRU") of a plurality of FRUs (10, 20), wherein the firmware includes one or more images, the instructions causing a processor (14) to perform steps comprising:

comparing a first bundle version identifier with a second bundle version identifier, said first bundle version identifier being associated with a first firmware version identifier for a first firmware image installed on said FRU, said first bundle version identifier being indicative of a first bundle of firmware images from which said first firmware image was obtained, said second bundle version identifier identifying a version of a second bundle of firmware images; and producing a match indication in the event said second bundle identifier equals said first bundle version identifier, said match indicating that said first firmware image matches a firmware image of said second bundle.

2. The computer-readable storage medium of claim 1, wherein said steps further comprise:

if said first bundle version identifier does not equal said second bundle version identifier, comparing said first image version identifier with at least one image version identifiers for firmware images in said second bundle; and if said first bundle version identifier equals a bundle version identifier for a firmware image in said second bundle, providing an indication that said first firmware image matches an image in said second bundle, and if said second image version identifier does not equal a version identifier for a firmware image in said second bundle, providing an indication that said first firmware image does not match a firmware image in said second bundle.

3. The computer-readable storage medium of claim 1, wherein the installed firmware includes a version identifier of each installed image of the FRU (12), and the first firmware bundle includes a version identifier of each image contained therein that corresponds to each installed image of the of the FRU (12).

4. The computer-readable storage medium of claim 1, further including computer-executable instructions for storing the version identifier of the first firmware bundle in memory (16) that is persistent relative to the plurality of FRUs (10, 20).

5. The computer-readable storage medium of claim 3, further including computer-executable instructions for storing the version identifier of each image of the first firmware bundle in memory (16) that is persistent relative to the plurality of FRUs (10, 20).

6. The computer-readable storage medium of claim 2, further including computer-executable instructions for storing the version identifier of the second firmware bundle in memory (22) of the FRU (12).

7. The computer-readable storage medium of claim 1, further including computer-executable instructions for storing the version identifier of each installed image of the FRU (12) in memory (22) of the FRU (12).

8. The computer-readable storage medium of claim 2, further including computer-executable instructions for only outputting information about firmware of the FRU (12) where a mismatch indication is produced.

9. The computer-readable storage medium of claim 2, further including computer-executable instructions for installing onto the FRU (12) an image of the second firmware bundle where a mismatch indication is produced.

10. The computer-readable storage medium of claim 9, further including computer-executable instructions for:

storing in memory (22) of the FRU (12) an indication that a version identifier of a firmware bundle from which one or more images were last installed onto the FRU (12) is invalid before installing onto the FRU (12) an image of the first firmware bundle; and storing in the memory (22) of the FRU (12) a version identifier of the second firmware bundle after successful installation.

11. The computer-readable storage medium of claim 9, further including computer-executable instructions for:

installing, onto components of the FRU (12), images of the second firmware bundle where the FRU (12) is part of a logical partition (20) that is currently running; and producing an indication that installation was not completed where at least one image of the second firmware bundle was not installed onto a component of the FRU (12) that should have received the at least one image.

12. The computer-readable storage medium of claim 1, wherein the plurality of FRUs (10, 20) together form a logical partition (20) of a system (10) of FRUs, and the second firmware bundle contains partition-specific images.

13. A computer-implemented process comprising:

comparing, using a computer, a first bundle-version identifier with a second bundle-version identifier, said first bundle-version identifier being associated with a first firmware version identifier for a first firmware image installed on a field-replaceable unit (FRU), said first bundle-version identifier being indicative of a first bundle of firmware images from which said first firmware image was obtained, said second bundle-version identifier identifying a version of a second bundle of firmware images; and producing, using said computer, a match indication in the event said first bundle identifier equals said first bundle-version identifier, said match indicating that said first firmware image matches a firmware image of said second bundle.

14. A computer-implemented process as recited in claim 13 further comprising:

if said first bundle-version identifier does not equal said second bundle-version identifier, comparing said first image-version identifier with at least one image-version identifiers for firmware images in said second bundle; and if said first bundle-version identifier equals a bundle-version identifier for a firmware image in said second bundle, providing an indication that said first firmware image matches an image in said second bundle, and if said second image-version identifier does not equal an image-version identifier for a firmware image in said second bundle, providing an indication that said first firmware image does not match a firmware image in said second bundle.

* * * * *

UNITED STATES PATENT AND TRADEMARK OFFICE
CERTIFICATE OF CORRECTION

PATENT NO. : 8,601,463 B2  
APPLICATION NO. : 13/258380  
DATED : December 3, 2013  
INVENTOR(S) : Paul Bouchier et al.

Page 1 of 1

It is certified that error appears in the above-identified patent and that said Letters Patent is hereby corrected as shown below:

In the Claims

In column 11, line 38, in Claim 3, after "image" delete "of the".

Signed and Sealed this
Thirteenth Day of May, 2014

Michelle K. Lee
*Deputy Director of the United States Patent and Trademark Office*